(12) United States Patent
Kim (10) Patent No.: US 9,977,754 B2
(45) Date of Patent: May 22, 2018

(54) ELECTRONIC SYSTEM WITH DIAGNOSTIC INTERFACE MECHANISM AND METHOD OF OPERATION THEREOF

(71) Applicant: Samsung Electronics Co., Ltd., Suwon-si, Gyeonggi-do (KR)

(72) Inventor: Jinsoo Kim, San Ramon, CA (US)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 417 days.

(21) Appl. No.: 14/477,774

(22) Filed: Sep. 4, 2014

(65) Prior Publication Data

US 2015/0074317 A1    Mar. 12, 2015

Related U.S. Application Data

(60) Provisional application No. 61/875,228, filed on Sep. 9, 2013.

(51) Int. Cl.
*G06F 13/28* (2006.01)

(52) U.S. Cl.
CPC .................................. *G06F 13/28* (2013.01)

(58) Field of Classification Search
CPC ....................................................... G06F 13/28
USPC .............................. 710/305, 308; 714/30, 45
See application file for complete search history.

(56) References Cited

U.S. PATENT DOCUMENTS

| | | | |
|---|---|---|---|
| 4,271,466 A * | 6/1981 | Yamamoto | G06F 13/28 710/22 |
| 5,983,340 A | 11/1999 | Garey et al. | |
| 6,457,074 B1 * | 9/2002 | Gaillard | G06F 13/28 710/107 |
| 6,539,488 B1 * | 3/2003 | Tota | G06F 5/06 710/305 |
| 6,915,127 B2 | 7/2005 | Sakuma | |
| 6,931,355 B2 | 8/2005 | Farrell et al. | |
| 7,069,176 B2 * | 6/2006 | Swaine | G06F 11/3636 702/176 |
| 7,080,283 B1 * | 7/2006 | Songer | G06F 11/3636 714/30 |
| 7,127,506 B1 | 10/2006 | Schmidt et al. | |
| 7,293,082 B1 | 11/2007 | Carew et al. | |
| 7,647,539 B2 | 1/2010 | Bussa et al. | |
| 8,543,287 B2 | 9/2013 | Stevens et al. | |

(Continued)

OTHER PUBLICATIONS

System Architecture for 3GPP LTE Modem using a Programmable Baseband Processor, 2009 , Department of Electrical Engineering, Linköping University, SE-581-83 Linköping Sweden.

(Continued)

*Primary Examiner* — Paul R Myers
(74) *Attorney, Agent, or Firm* — IP Investment Law Group (57) ABSTRACT

A electronic system includes: an integrated circuit including: an internal data path, configured to drive a functional output, a universal streaming and logging interface, coupled to the internal data path, to generate a trace data bus, and a direct memory access (DMA) controller, coupled to the universal streaming and logging interface, to manage the storage of the trace data bus; a support circuit, coupled to the integrated circuit, configured to receive the trace data bus; and a support processor chip, coupled to the support circuit, configured to analyze the trace data bus for identifying a failure mode of the integrated circuit.

20 Claims, 9 Drawing Sheets

(56) References Cited

U.S. PATENT DOCUMENTS

| | | | | |
|---|---|---|---|---|
| 2002/0194401 | A1* | 12/2002 | Sakugawa | G06F 13/30 |
| | | | | 710/28 |
| 2005/0086454 | A1* | 4/2005 | Morigaki | G06F 11/364 |
| | | | | 712/227 |
| 2006/0255981 | A1* | 11/2006 | Swoboda | G06F 11/3636 |
| | | | | 341/51 |
| 2006/0259822 | A1* | 11/2006 | Swoboda | G06F 11/3636 |
| | | | | 714/38.13 |
| 2010/0332909 | A1* | 12/2010 | Larson | G06F 11/3476 |
| | | | | 714/40 |
| 2011/0225456 | A1* | 9/2011 | Whetsel | G01R 31/318533 |
| | | | | 714/27 |
| 2013/0091389 | A1* | 4/2013 | Swoboda | G06F 11/3476 |
| | | | | 714/45 |
| 2013/0212425 | A1* | 8/2013 | Blaine | G06F 11/3648 |
| | | | | 714/6.1 |
| 2013/0246676 | A1* | 9/2013 | Hesse | G06F 13/38 |
| | | | | 710/110 |

OTHER PUBLICATIONS

Implementation of a DSS Modem ASIC chip for Wireless LAN, 1998, IEEE.

\* cited by examiner

ELECTRONIC SYSTEM WITH DIAGNOSTIC INTERFACE MECHANISM AND METHOD OF OPERATION THEREOF

CROSS REFERENCE TO RELATED APPLICATION(S)

This application claims the benefit of U.S. Provisional Patent Application Ser. No. 61/875,228 filed Sep. 9, 2013, and the subject matter thereof is incorporated by reference herein.

TECHNICAL FIELD

An embodiment of the present invention relates generally to an electronic system, and more particularly to a system for monitoring internal functions for electronic systems.

BACKGROUND

Modern electronic systems rely on rapid development of the latest features. The integrated circuit development process has made great strides to simulate the intended circuits in order to shorten the development time. Unfortunately the manufacturing processes are subject to difficulties, such as contamination, parasitic devices, varying concentrations of grown layers, and the like. The identification of these failure modes can consume extended periods of time and carry a very large price tag. The true cost of identifying a failure mechanism is not measured by the initial delay, but rather the loss of volume shipments at the end of life of the integrated circuit.

In order to alleviate the potential for delay, testing and analysis is performed at every opportunity. Some internal circuits, that are not testable at the edge of an integrated circuit can be wired to an input/output driver in order to add visibility to the internal circuitry. Unfortunately that technique can add delay to the internal circuit and the frequency of transitions of the circuit can be limited by the bandwidth of the output driver that was only added to show the internal circuit operation.

Some approaches can monitor internal circuitry only in static states and do not provide a full picture of the circuit operation. All of these difficulties are dealt with on a daily basis as our society utilizes more and more integrated circuit devices in our daily lives. The convenience of our smartphones, personal music players, video players, hand-held games and the like are prevalent throughout the world. Each of these developments can contain millions of transistors that must be verified during the development and manufacturing processes.

Thus, a need still remains for electronic system with diagnostic interface mechanism to improve development cycles and manufacturing reliability. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

SUMMARY

An embodiment of the present invention provides an electronic system including: an integrated circuit including: an internal data path, configured to drive a functional output, a universal streaming and logging interface, coupled to the internal data path, to generate a trace data bus, and a direct memory access (DMA) controller, coupled to the universal streaming and logging interface, to manage the storage of the trace data bus; a support circuit, coupled to the integrated circuit, configured to receive the trace data bus; and a support processor chip, coupled to the support circuit, configured to analyze the trace data bus for identifying a failure mode of the integrated circuit.

An embodiment of the present invention provides a method of operation of an electronic system including: monitoring an integrated circuit including: enabling an internal data path, configured to drive a functional output, generating a trace data bus including capturing, by a universal streaming and logging interface, the status of the internal data path, and accessing a direct memory access (DMA) controller, for managing the storage of the trace data bus through the universal streaming and logging interface; configuring a support circuit, for receiving the trace data bus; and analyzing the trace data bus for identifying a failure mode of the integrated circuit.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

Various embodiments provide a universal streaming and logging interface that can be integrated in any type of the integrated circuit. The implementation can provide visibility to the operations of the internal data path of the integrated circuit without the limitations of bandwidth limiting input/output pins. The universal streaming and logging interface and its supporting hardware can capture real-time execution status of the integrated circuit without dramatically increasing the number of the input/output pins. The operational trace data can be transferred to an external device, such as the second support circuit for failure analysis by a support processor chip to determine the cause of failure of the integrated circuit.

Various embodiments provide the integrated circuit that can include the streaming and logging interface can capture and log both synchronous and asynchronous data from the internal data path and selectively present the DMA data while continuing to store the trace data bus in a main buffer. This capability can allow diagnostic processes such as run until failure while logging the internal data path or to start collecting data upon failure of the internal data path. In an alternative operation the trace data bus can be stored in the main buffer prior to and after the failure of the internal data path. The data can be analyzed to determine what caused the failure event.

Various embodiments provide a data packer unit that can provide a flexible data collection mechanism that can be configured in many different ways. An embodiment shown is only an example and the number of the four bit registers can be of a different capacity to support higher or lower bandwidth needs.

Various embodiments provide a data packetizer circuit that can provide a scalable performance of logging detailed status of the internal data path of the integrated circuit. The delivery of a time stamped packet including sequence numbers and packet status, can provide complete visibility to aid in the diagnosis of failures in the integrated circuit.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation. The embodiments have been numbered first embodiment, second embodiment, etc. as a matter of descriptive convenience and are not intended to have any other significance or provide limitations for an embodiment of the present invention.

The term "module" referred to herein can include software, hardware, or a combination thereof in an embodiment of the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof. Further, if a module is written in the apparatus claims section below, the modules are deemed to include hardware circuitry for the purposes and the scope of apparatus claims.

The term "unit" referred to herein is a circuit formed of hardware components or hardware state machines used for specific functions that are timing critical and do not include software functions or support.

Figure 1:
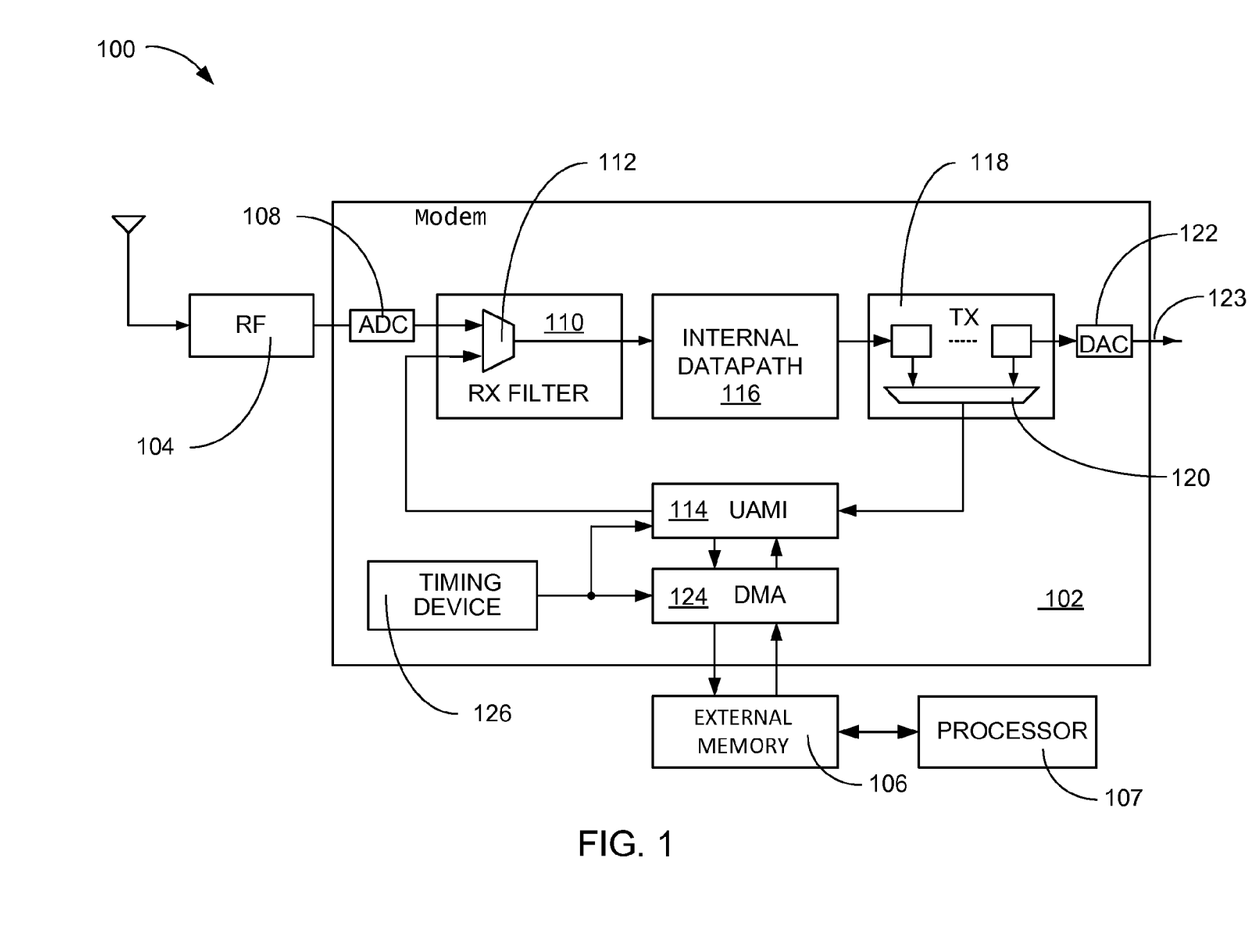
FIG. 1 is an electronic system with diagnostic interface mechanism in an embodiment of the present invention.

Referring now to FIG. 1, therein is shown an electronic system 100 with diagnostic interface mechanism in an embodiment of the present invention. The electronic system 100 includes an integrated circuit 102, such as a modem circuit, a communication circuit, or a processor circuit. The integrated circuit 102 can be implemented with a very high transistor count and high speed logic.

For illustrative purposes, the electronic system 100 is described with the integrated circuit 102 as a communication device, although it is understood that the integrated circuit 102 can be different types of devices. For example, the integrated circuit 102 can also be a device for communicating images or a multi-media function. As an example, the integrated circuit 102 can be a circuit for a high definition television, a computer tablet, a computer monitor, a personal digital assistant, a cellular phone, an optical driver, an optical receiver, or a multi-media phone. In another example, the integrated circuit 102 can be utilized in a signal receiver for receiving broadcast or live stream signals, such as a television receiver, a cable box, a satellite dish receiver, or a web enabled device.

The electronic system 100 can include a first support circuit 104. The support first support circuit 104 can be an interface device for the function of the integrated circuit 102. In the exemplary embodiment, the first support circuit 104 is shown to be a radio frequency receiver unit, though it is understood that the first support circuit 104 could be a different type of device or function.

The electronic system 100 can include a second support circuit 106. The second support circuit 106 can be a memory device, coupled to a direct memory access (DMA) controller 124 of the integrated circuit 102, for storing status information collected from within the integrated circuit 102. The second support circuit 106 can maintain the logged information of the internal operation of the integrated circuit 102. The integrated circuit 102 can perform normal operations in real-time while the second support circuit 106 collects the operational status for the internal signals.

A support processor chip 107, such as a processor, microprocessor, application specific integrated circuit (ASIC) can be coupled to the second support circuit 106. The support processor chip 107 can analyze the contents of data stored in the second support circuit 106. The support processor chip 107 can be capable of interacting with the second support circuit 106 in order to determine a failure mode of the integrated circuit 102 during real time operation.

An embodiment of the integrated circuit 102 can include an analog-to-digital converter (ADC) 108 coupled to the first support circuit 104. The ADC 108 can convert the analog signal from the first support chip 104 to a digital signal for internal operations of the integrated circuit 102. In the exemplary embodiment of the integrated circuit 102 the ADC 108 can be coupled to a receiver filter unit 110 that includes an input multiplexer unit 112, which can provide a support function of a universal streaming and logging interface 114.

The receiver filter unit 110 can be coupled to an internal data path 116, which includes the functional circuitry of the integrated circuit 102. The an internal data path 116 can be coupled to a transmitter unit 118, which provides an external interface for the integrated circuit 102, through a digital-to-analog converter (DAC) 122, as well as a sensing multiplexer unit 120. The DAC 122 can provide a functional output 123 for the example of the integrated circuit 102. The sensing multiplexer unit 120 can provide signal input to the universal streaming and logging interface 114.

It is understood that the functional output 123 can be an interface for delivering the intended output of the function housed in the integrated circuit 102. By way of an example the functional output 123 can be a modem output, a video driver, an audio driver, a control function, a processor, or the like. The universal streaming and logging interface 114 can provide a tracing capability of the internal data path 116 of the integrated circuit 102.

The universal streaming and logging interface 114 can be coupled to a direct memory access (DMA) controller 124 for storing and retrieving status of the internal data path 116 through the input multiplexer unit 120. The movement of the status is coordinated by a timing device 126 that provides clocks to the universal streaming and logging interface 114 and the DMA 122.

It has been discovered that the universal streaming and logging interface 114 can be integrated in any type of the integrated circuit 102. The implementation can provide visibility to the operations of the internal data path 116 without the limitations of bandwidth limiting input/output pins. The universal streaming and logging interface 114 and its supporting hardware can capture real-time execution status of the integrated circuit 102 without dramatically increasing the number of the input/output pins. The operational trace data can be transferred to an external device, such as the second support circuit for failure analysis by a support processor chip 107 to determine the cause of failure of the integrated circuit 102.

Figure 2:
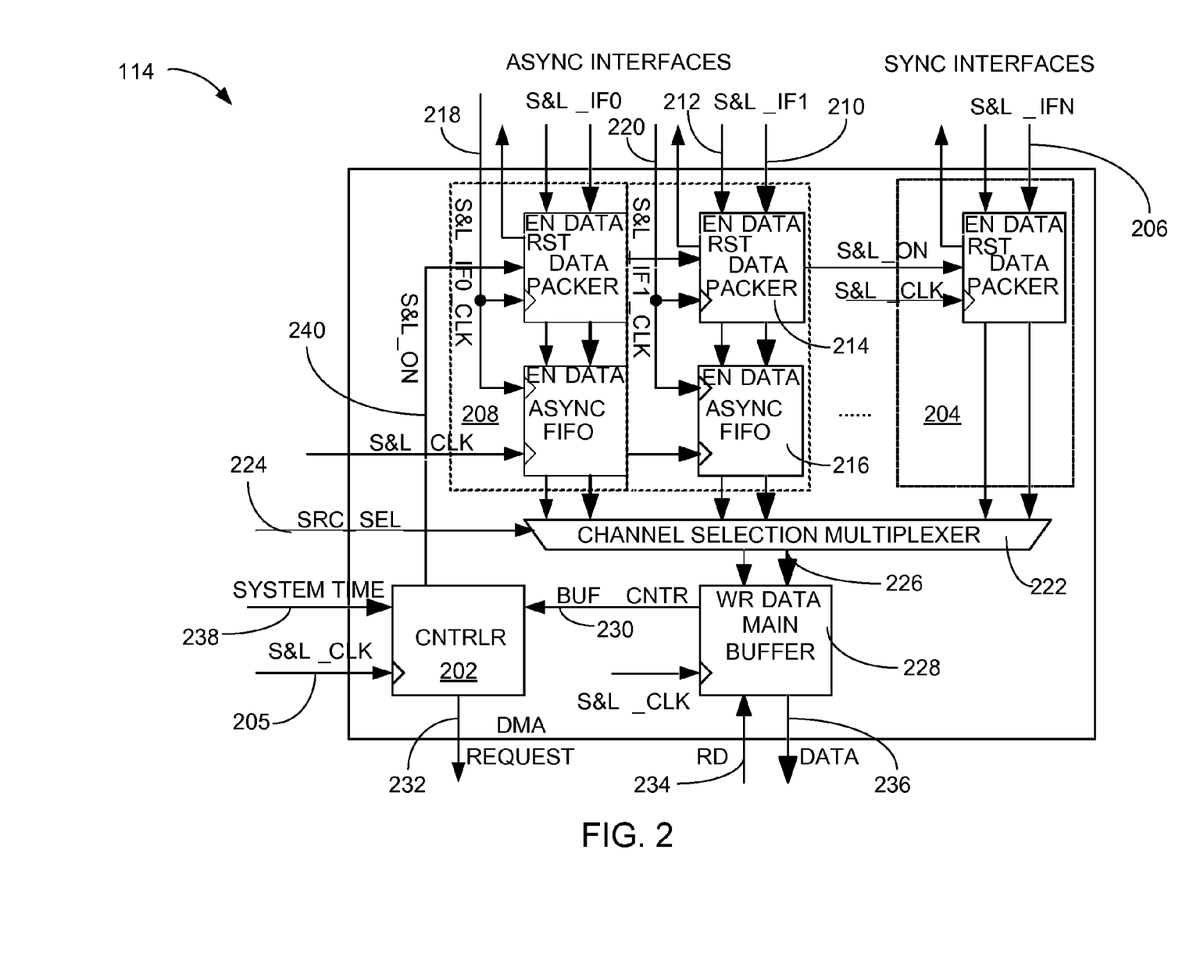
FIG. 2 is an exemplary block diagram of a universal streaming and logging interface in an embodiment.

Referring now to FIG. 2, therein is shown an exemplary block diagram of a universal streaming and logging interface 114 in an embodiment. The exemplary block diagram of the universal streaming and logging interface 114 depicts a streaming and logging control unit 202 that manages the operations of the universal streaming and logging interface 114.

The streaming and logging control unit 202 can support synchronous data capture and asynchronous data capture. A synchronous capture unit 204 can be controlled by an S&L_ON term from the streaming and logging control unit 202 and an S&L_CLK 205 provided from the timing device 126 of FIG. 1. The synchronous capture unit 204 can receive synchronous data from anywhere in the internal data path 116 of FIG. 1. The synchronous data can be assembled into a sync data bus 206 for capture by the synchronous capture unit 204. The synchronous capture unit 204 can capture up to 32 bits from the internal data path 116 at a time. It is understood that any number of the synchronous capture unit 204 can be included in the universal streaming and logging interface 114.

An asynchronous logging interface unit 208 can receive async data 210, from the internal data path 116, that is not synchronous to the S&L_CLK 205 and an async data latch enable 212 can be provided to a data packer unit 214 to capture the async data 210. The data packer unit 214 can provide the captured data to an async first-in-first-out (FIFO) register 216 that is synchronized to the S&L_CLK 205 provided from the timing device 126. The asynchronous logging interface unit 208 can be instantiated in pairs to provide a left bank/right bank structure for asynchronous data the becomes valid at different times. A S&L_IF0_CLK 218 and a S&L_IF1_CLK 220 can be used to capture the data in preparation of synchronizing the data with the S&L_CLK 205 provided from the timing device 126. The S&L_IF0_CLK 218 and the S&L_IF1_CLK 220 can be developed in the asynchronous domain that sources the async data 210.

The data packer unit 214 can be coupled to the async FIFO register 216, which can synchronize the timing between the S&L_IF0_CLK 218 and the S&L_IF1_CLK 220 and the S&L_CLK provided from the timing device 126. The data packer unit 214 can pack non-32 bit data into a 32 bit array in order to transfer to the async FIFO register 216.

It is understood that any number of the synchronous capture unit 204 and the asynchronous logging interface unit 208 can be included in the universal streaming and logging interface 114. While the universal streaming and logging interface 114 is shown including two of the asynchronous logging interface unit 208, this is an example only and a different number of the asynchronous logging interface unit 208 can be instantiated in order to meet the needs of the electronic system 100 of FIG. 1.

A channel selection multiplexer 222 can be provided to the universal streaming and logging interface 114 in order to implement specific logging strategy. The channel selection multiplexer 222 can be addressed by a source select bus 224 in order to pass the bit structure associated with the selected channel 0-N. In one embodiment, the channel selection multiplexer 222 can pass a 32 bit bus structure as selected by the source select bus 224.

The channel selection multiplexer 222 can present a trace data bus 226 to a main buffer 228. The width of the trace data bus 226 and the width of the main buffer 228 is determined when the streaming and logging interface 114 is instantiated. The main buffer 228 can be a high speed memory device, such as a static random access memory (SRAM) or a register array. The data on both sides of the channel selection multiplexer 222 is in the domain of the S&L_CLK 205 provided from the timing device 126.

The main buffer 228 can provide a word count alert 230 to the streaming and logging control unit 202. Upon receiving the word count alert 230, the streaming and logging control unit 202 can assert a DMA request 232 in order to transfer the data contained in the main buffer 228 to the DMA controller 124 of FIG. 1. A DMA read line 234 can gate DMA data 236 out of the main buffer 228 in response to the DMA request 232. A system time bus 238 can be used by the streaming and logging control unit 202 in order to manage event logging and streaming of the captured data from the integrated circuit 102. The streaming and logging control unit 202 can use the system time bus 238 to manipulate a S&L_ON enable 240 that starts and stops the logging functions.

It has been discovered that the streaming and logging interface 114 can capture and log both synchronous and asynchronous data from the internal data path 116 and selectively present the DMA data 236 while continuing to store the trace data bus 226 in the main buffer 228. This capability can allow diagnostic processes such as run until failure while logging the internal data path 116 or to start collecting data upon failure of the internal data path 116. In an alternative operation the trace data bus 226 can be stored in the main buffer 228 prior to and after the failure of the internal data path 116. The data can be analyzed to determine what caused the failure event.

In an alternative embodiment of the streaming and logging interface 114 the instances of the data packer 224 can be positioned between the channel selection multiplexer 222 and the main buffer 228. This embodiment can reduce the hardware footprint of the streaming and logging interface 114, but can make alter the capture timing.

Figure 3:
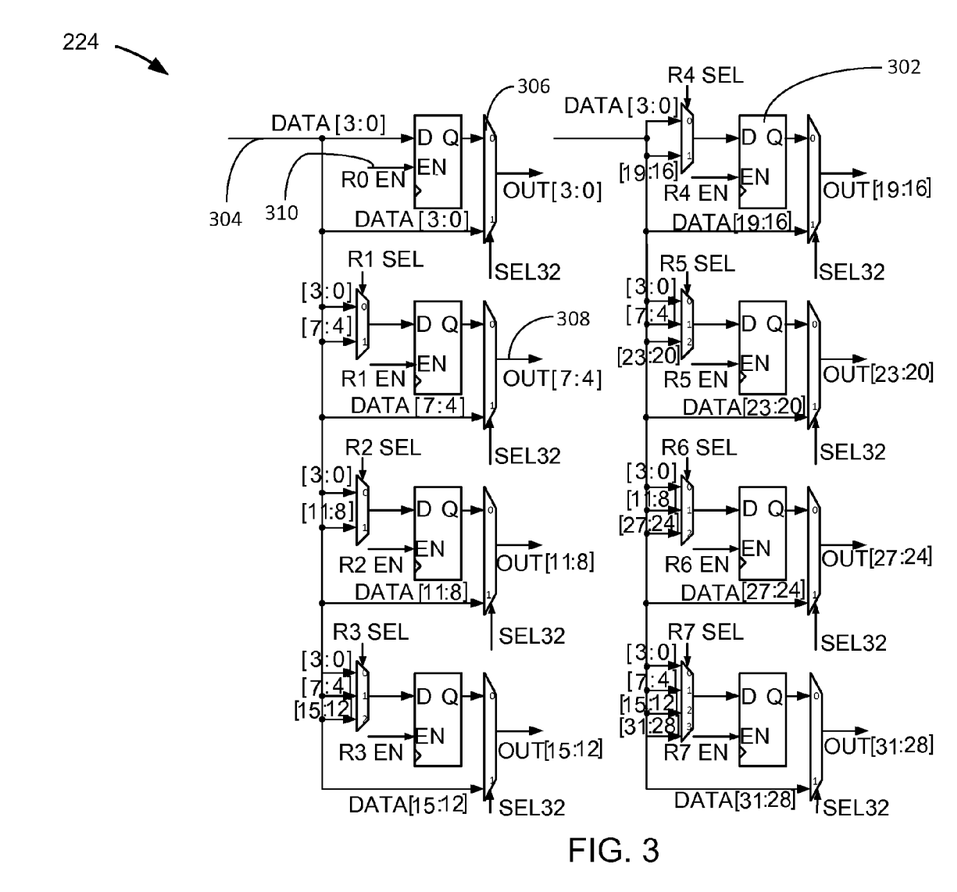
FIG. 3 is an exemplary block diagram of a data packer unit in an embodiment.

Referring now to FIG. 3, therein is shown an exemplary block diagram of a data packer unit 214 in an embodiment. The exemplary block diagram of a data packer unit 214 can include a plurality of four bit registers 302 that can be loaded from a data bus 304 that is trace data from the internal data path 116 of FIG. 1.

In this example, there are eight of the four bit registers 302, which are coupled to eight two-to-one multiplexers 306. The output of the two-to-one multiplexers 306 can form a 32 bit output bus 308. The R0-R7 register select lines 310 can change the configuration of the 32 bit output bus 308.

It has been discovered that the data packer unit 214 can provide a flexible data collection mechanism that can be configured in many different ways. The embodiment shown is only an example and the number of the four bit registers 302 can be of a different capacity to support higher or lower bandwidth needs.

Figure 4:
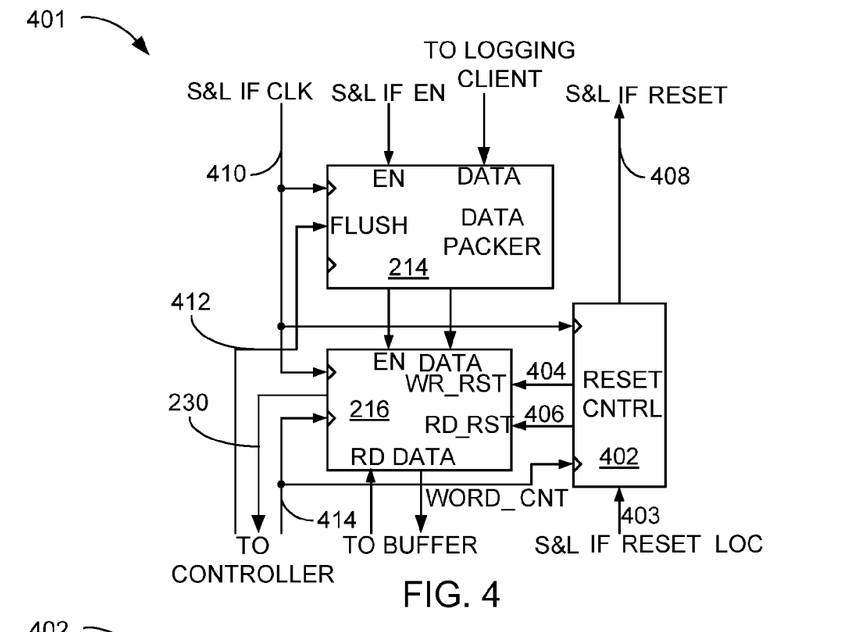
FIG. 4 is an exemplary block diagram of an asynchronous logging interface unit in an embodiment.

Referring now to FIG. 4, therein is shown an exemplary block diagram of an asynchronous logging interface 401 in an embodiment. The exemplary block diagram of an asynchronous logging interface 401 depicts the data packer 214 coupled to the async FIFO register 216. A reset control unit 402 is coupled to the data packer 214 and the async FIFO register 216. The reset control unit 402 can receive a S&L interface reset local 403 in order to initiate the reset sequence. The reset control unit 402 can provide a write reset 404 and a read reset 406 to the async FIFO register 216, for clearing-out the data, as well as an S&L interface reset 408 sent to the DMA controller 124 of FIG. 1.

The reset control unit 402 receives an S&L interface clock 410 that is also coupled to the data packer 214 and the async FIFO register 216. The reset control unit 402 can use the S&L interface clock 410 to control the timing of assertion and release of the write reset 404 and the read reset 406. The word count alert 230 can be provided by the async FIFO register 216 in order to solicit a DMA request for transferring the data out of the async FIFO register 216.

A flush signal 412 can be coupled to the data packer 214 for flushing the data from the four bit registers 302. The flush signal 412 can be sourced from the streaming and logging control unit 202 of FIG. 2. A word count signal 414 can be provided by the streaming and logging control unit 202 to indicate that a maximum word count has been transferred and the operation is terminated.

Figure 5:
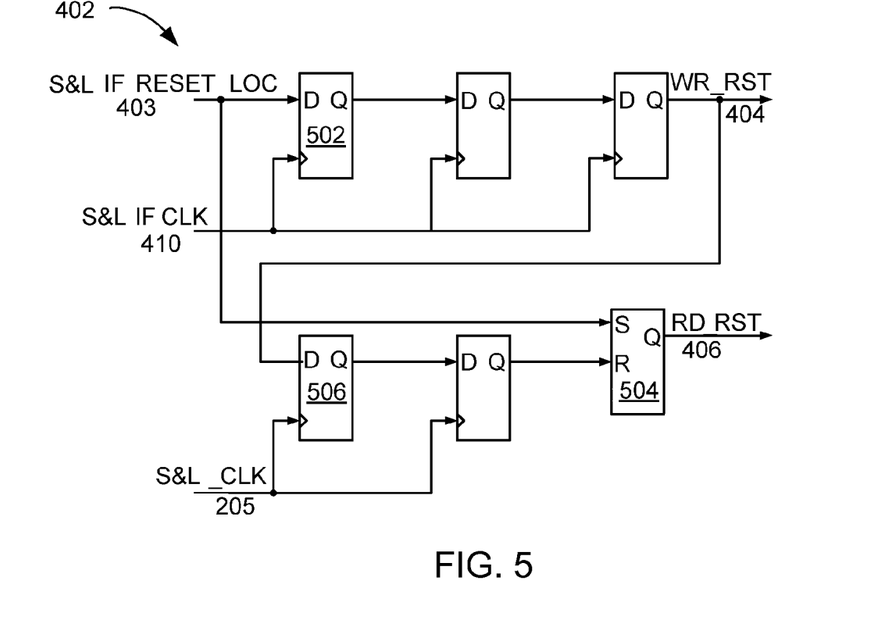
FIG. 5 is an exemplary block diagram of a reset control circuitry in an embodiment.

Referring now to FIG. 5, therein is shown an exemplary schematic of a reset control circuitry 402 in an embodiment. The exemplary schematic of a reset control circuitry 402 depicts the S&L interface reset local 403 for initiating a reset sequence coupled to first delay flip flop (FF) 502 and a read reset latch 504. At the initial setting of the S&L interface reset local 403, the read reset 406 is asserted, but the write reset 404 is delayed.

The S&L interface clock 410 can pass the S&L interface reset local 403 through the first delay FF 502. After two additional cycles of the S&L interface clock 410, write reset 404 can be asserted. The write reset 404 will remain asserted for three cycles of the S&L interface clock 410 after the S&L interface reset local 403 has been negated.

When the write reset 404 is asserted a reset delay FF 506 can delay the negation of the read reset 406. The reset delay FF 506 can be clocked by the S&L_CLK 205, which can be controlled by a diagnostic interface of the integrated circuit 102 of FIG. 1. After two cycles of the S&L_CLK 205, read reset 406 can be negated.

It is understood that the delay and timing of the write reset 404 and the read reset 406 is an example only and other timing structures can be envisioned. It is also understood that the relationship of the S&L interface clock 410 and the S&L_CLK 205 can be critical and the positive edge transitions must be aligned in order to prevent race conditions in the reset delay FF 506.

Figure 6:
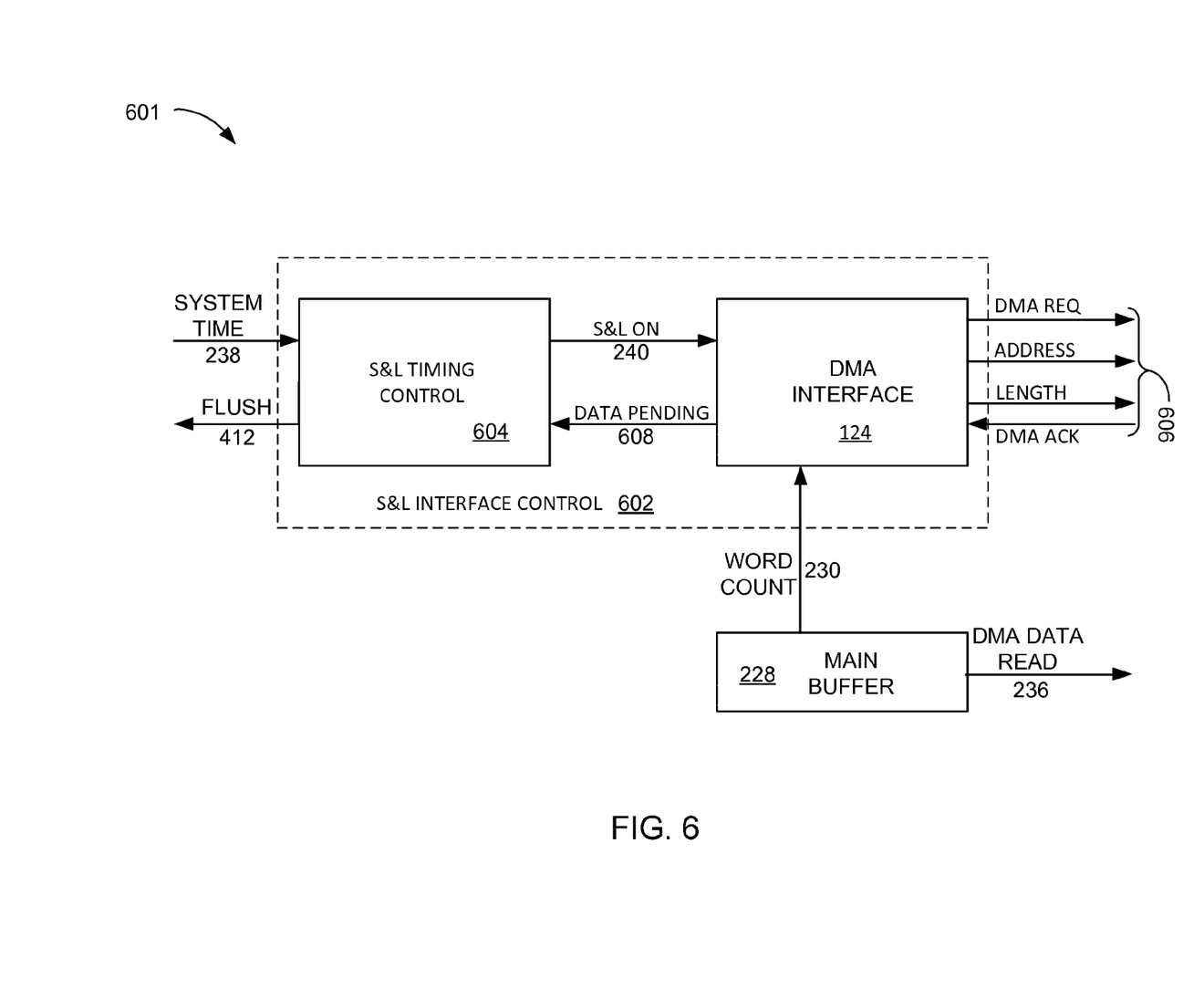
FIG. 6 is an exemplary block of a universal streaming and logging interface control function in an embodiment.

Referring now to FIG. 6, therein is shown an exemplary block diagram of a universal streaming and logging interface control function 601 in an embodiment. The exemplary block diagram of a universal streaming and logging interface control function 601 depicts a universal streaming and logging interface control 602 including a streaming and logging timing control 604 coupled to the DMA interface 124. The DMA interface 124 can have a data transfer control bus 606, which can include a DMA request, a starting address, a length, and a DMA acknowledge.

The main buffer 228 can be coupled to the universal streaming and logging interface control 602 and the DMA interface 124 in order to present the word count alert 230 indicating that the main buffer 228 has met a transfer requirement and the data is ready to be sent as the DMA data 236.

The streaming and logging timing control 604 can enable the transfers of the DMA data 230 as long as the S&L_ON enable 240 is asserted. A data pending status 608 can indicate that additional transfers of the DMA data 230 are pending. When the data pending status is negated, indicating that all of the data has been transferred, the streaming and logging timing control 604 can negate the S&L_ON enable 240.

Upon the negation of the S&L_ON enable 240, the streaming and logging timing control 604 can assert the flush signal 412 indicating that each of the data packer unit 214 of FIG. 2 can clear the data remaining within the four bit registers 302 of FIG. 3. The system time bus 238 can provide a time stamp for the streaming and logging timing control 604 to be transferred with the DMA data 230.

Figure 7:
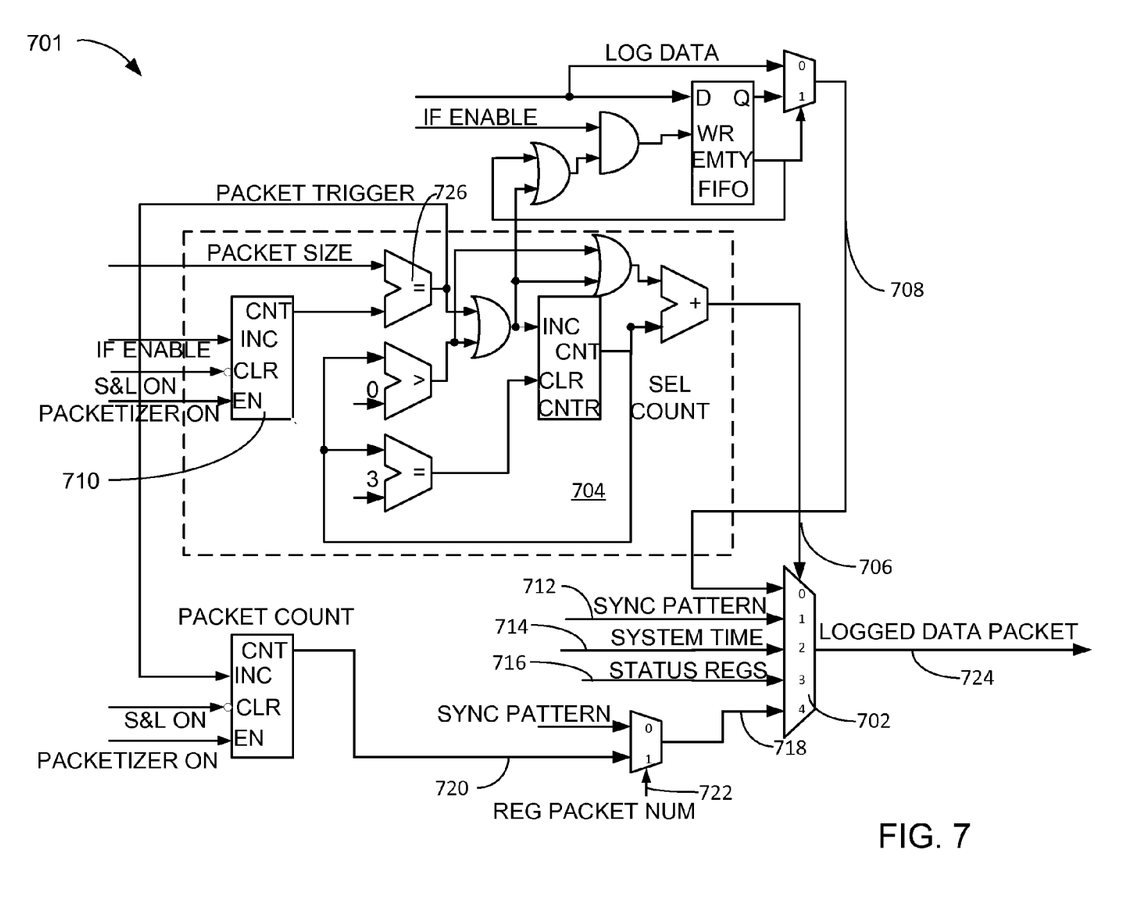
FIG. 7 is an exemplary schematic of a data packetizer circuit of the universal streaming and logging interface of FIG. 2 in an embodiment.

Referring now to FIG. 7, therein is shown an exemplary schematic of a data packetizer circuit 701 of the universal streaming and logging interface 114 of FIG. 2 in an embodiment. The exemplary schematic of a data packetizer circuit 701 depicts a packet generation multiplexer 702 for sequencing the log data, a synchronization pattern, the system time bus 238, status registers, and a finished packet number or the synchronization pattern.

In the event of a logging error, rather than losing the entire data, an error condition status can be attached to a frame of logging data in order to identify an incomplete transfer of the logging data. A packet status will include a timestamp to identify the failure timing. Upon analysis of the transferred data, firmware will be able to identify which timeframe can be deemed valid and what caused the universal streaming and logging interface 114 of FIG. 1 to fail.

The packet can be resized in order to accommodate the internal operating conditions and bus performance. The universal streaming and logging interface 114 will log data first. At the end of each packet, the universal streaming and logging interface will write out a synchronization pattern, timestamp and bus response.

A packetizer selection logic 704 can increment the select lines 706 between 0 and 3 in order to sequence the elements of the packet through the packet generation multiplexer 702. It is understood that the packet generation multiplexer 702 can operate in a serial or parallel mode of transfer. It is further understood that the bus width, if operated in a parallel process can be greater than or equal to the width of the main buffer 228 of FIG. 2.

During the operation of the packet generation multiplexer 702, the log data 708 is transferred first. A packet data counter 710 can monitor the number of words of the log data 708 that are transferred. When the packet data counter 710 reaches the expected count, as determined by a packet size comparator 726, the packetizer selection logic 704 can be incremented to transfer a synchronization pattern 712. The synchronization pattern 712 can be any unique pattern identifiable by firmware analysis.

The packetizer selection logic 704 can increment to transfer the system time stamp 714. The system time stamp 714 can provide a sequential time marker for analyzing multiple of the data packets. The packetizer selection logic 704 can increment to transfer Status registers 716.

The status registers 716 can identify errors that can impact the transfer of the packet as referenced in the following table:

TABLE 1

| Name | Width | Description |
| --- | --- | --- |
| Buffer Overflow | 1 | Indicates health of packet. Buffer overflow indicates that packet is damaged by losing samples. |
| Bus Error | 2 | Indicates health of packet. Bus error indicates that packet might not be written properly. This field records actual bus response. |
| Pending Req # | 3 | Logs internal status of universal streaming and logging interface. High number of pending req # indicates that bus performance is below expectation. |
| Main Buffer # | 10 | It logs internal status of Main Buffer. High number of word count in Main Buffer indicates that bus performance is below expectation. |
| Async FIFO # | 3 | It logs internal status of Async FIFO. |

The packetizer selection logic 704 can increment to transfer a packet end 718, which can be either a packet number 720 or the synchronization pattern 712 depending on the state of a register packet number bit 722 in a configuration register (not shown). The resultant logged data packet 724 can provide detailed status of the internal data path 116, in real-time, for analysis of the internal failures of the integrated circuit 102 of FIG. 1.

It has been discovered that an embodiment of the data packetizer circuit 701 can provide a scalable performance of logging detailed status of the internal data path 116 of the integrated circuit 102. The delivery of a time stamped packet including sequence numbers and packet status, can provide complete visibility to aid in the diagnosis of failures in the integrated circuit 102.

Figure 8:
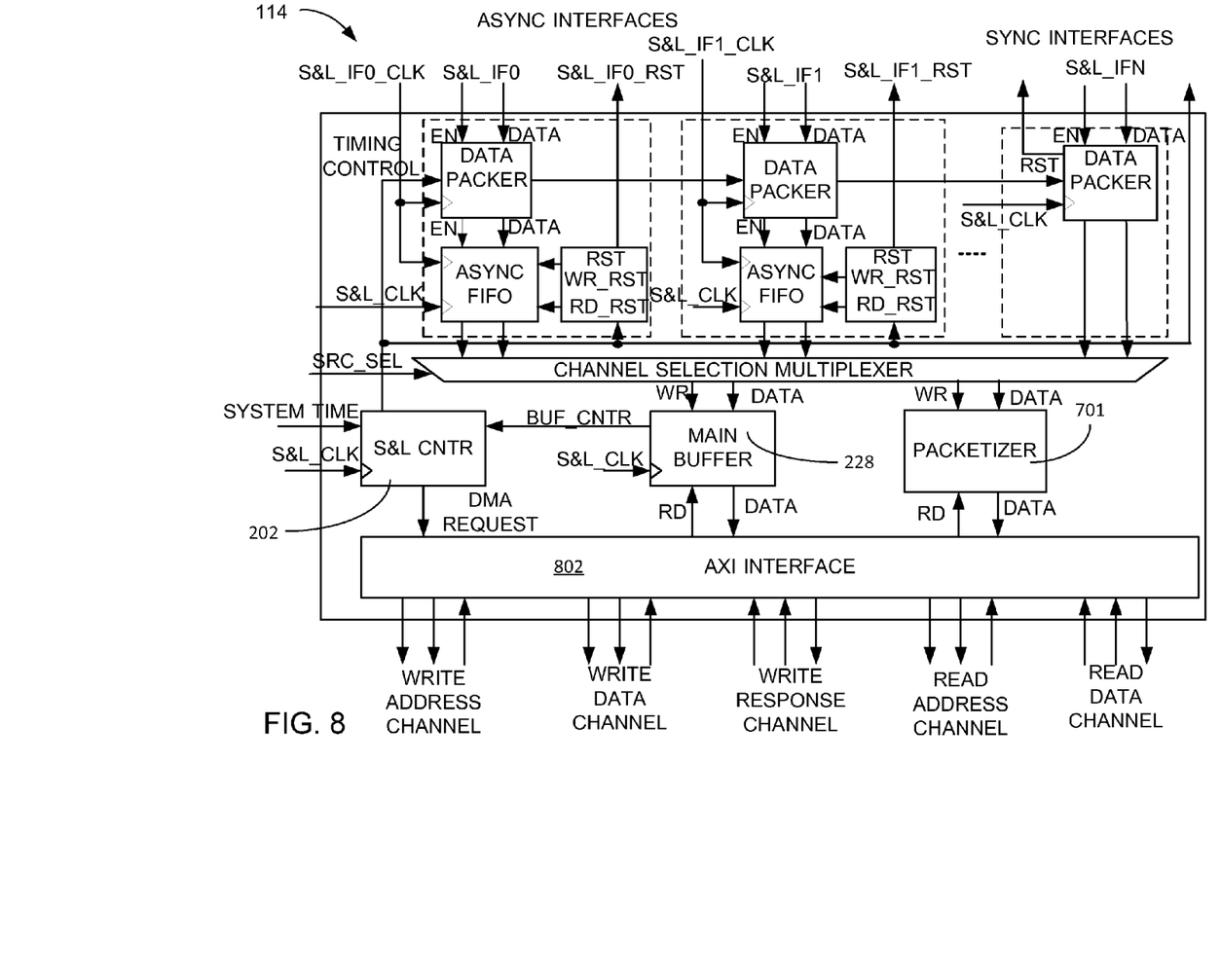
FIG. 8 is an exemplary block diagram of a universal streaming and logging interface in an alternative embodiment of the present invention.

Referring now to FIG. 8, therein is shown an exemplary block diagram of the universal streaming and logging interface 114 in an alternative embodiment of the present invention. The exemplary block diagram of the universal streaming and logging interface 114 depicts an advanced extensible interface (AXI) interface 802 coupled to the streaming and logging control unit 202, the main buffer 228, and the packetizer 701. The AXI interface can provide separate address/control and data phases, can support unaligned data transfers using byte strobes, burst based transactions with only start address, multiple queued transfers, and adjustable timing by adding register stages.

It has been discovered that the universal streaming and logging interface 114 can take advantage of the flexibility and efficiency of the AXI interface 802. The ability of the universal streaming and logging interface 114 to provide variable length packetized logging data in the event of a failure of the integrated circuit 102 under analysis can be a key aspect in determining how and why the integrated circuit 102 failed during its operation.

Figure 9:
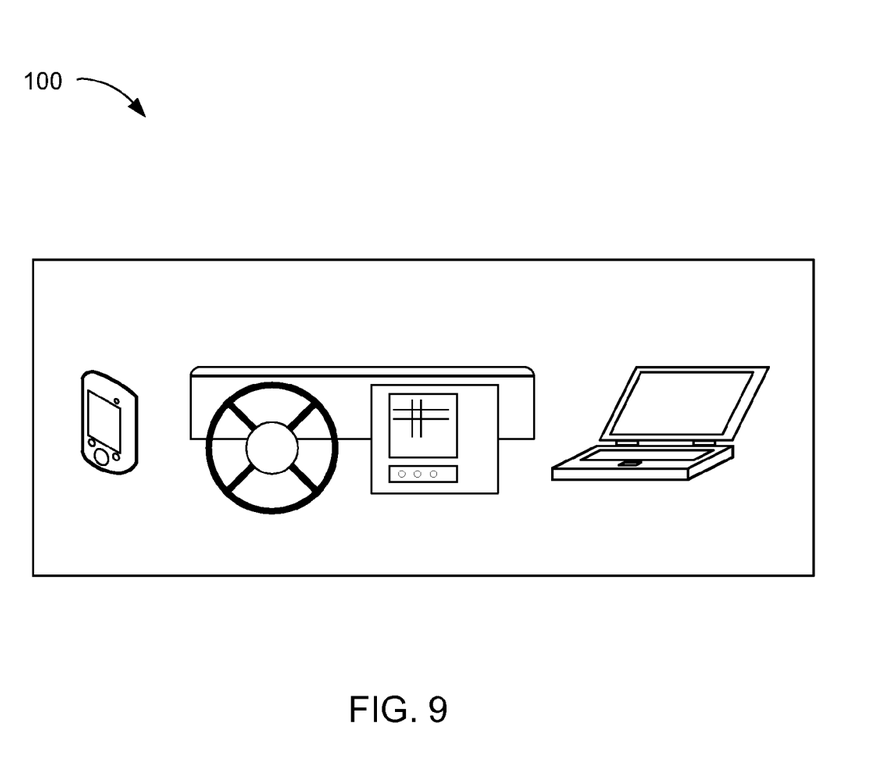
FIG. 9 is examples of the electronic system as application examples with the embodiment of the present invention.

Referring now to FIG. 9, therein is shown example embodiments for the use of the electronic system 100, such as in a smart phone, the dash board monitor of an automobile, and a notebook computer.

These application examples illustrate the importance of the various embodiments of the present invention to provide improved failure analysis features while minimizing costly delays by reducing unnecessary interactions requiring additional instrumentation, deconstruction of the integrated circuit 102 involved, and allow analysis of internal circuits during real-time operation of the integrated circuit 102.

The electronic system 100, such as the smart phone, the dash board monitor, and the notebook computer, can include one or more of a subsystem (not shown), such as a printed circuit board including various embodiments of the present invention or an electronic assembly including various embodiments of the present invention. The electronic system 100 can also be implemented on an adapter card.

Figure 10:
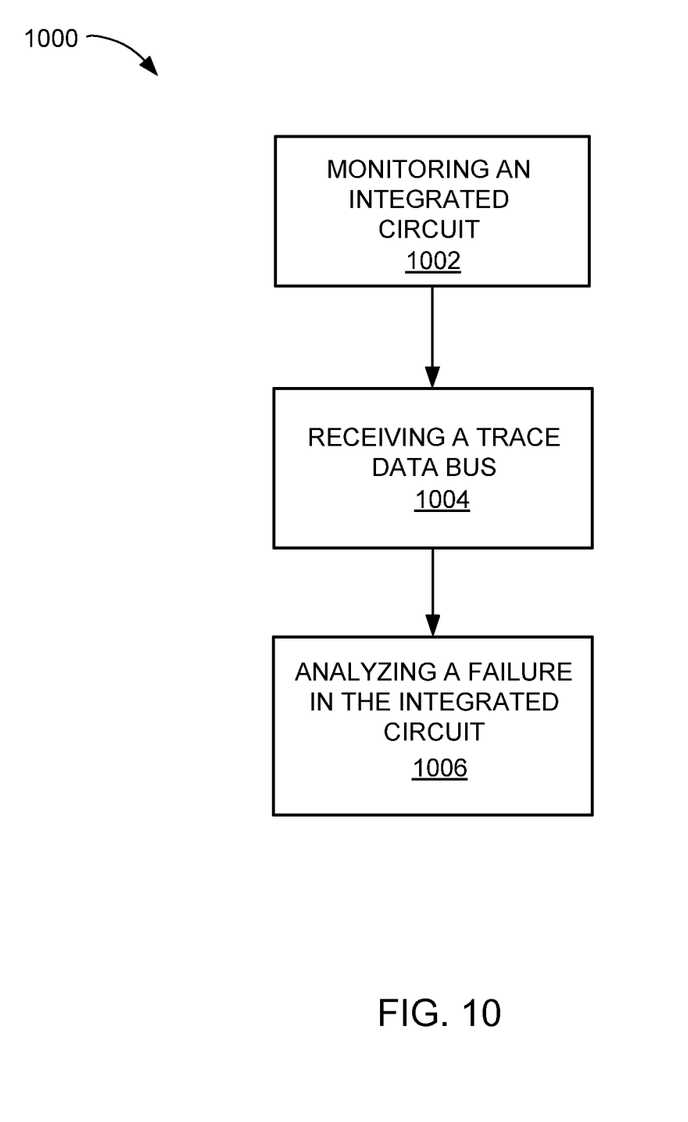
FIG. 10 is a flow chart of a method of operation of an electronic system in a further embodiment of the present invention.

Referring now to FIG. 10, therein is shown a flow chart of a method 900 of operation of an electronic system 100 in a further embodiment of the present invention. The method 900 includes: monitoring an integrated circuit including: enabling an internal data path, configured to drive a functional output, generating a trace data bus including capturing, by a universal streaming and logging interface, the status of the internal data path, and accessing a direct memory access (DMA) controller, for managing the storage of the trace data bus through the universal streaming and logging interface in a block 1102; configuring a support circuit, for receiving the trace data bus in a block 1104; and analyzing the trace data bus for identifying a failure mode of the integrated circuit in a block 1106.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. An electronic system comprising:
an integrated circuit including:
an internal data path, configured to drive a functional output of the integrated circuit,
a universal streaming and logging interface, coupled to the internal data path, to generate a trace data bus and a direct memory access (DMA) request within the integrated circuit including selecting a combination of four bit registers sampling the internal data path to form the trace data bus, and
a DMA controller, coupled to the trace data bus and the DMA request, to manage the storage of the trace data bus, in an external device, based on the DMA request;
a support circuit, coupled to the integrated circuit, configured as the external device to receive the trace data bus includes a memory device coupled to the DMA of the integrated circuit; and
a support processor chip, coupled to the support circuit, configured to analyze the trace data bus for identifying a failure mode of the integrated circuit.

2. The system as claimed in claim 1 wherein the universal streaming and logging interface includes a synchronous capture unit comprising a plurality of registers loaded from the internal data path.

3. The system as claimed in claim 1 wherein the universal streaming and logging interface includes an asynchronous logging interface unit comprising a plurality of registers loaded from the internal data path.

4. The system as claimed in claim 1 wherein the universal streaming and logging interface includes a data packetizer circuit coupled to a main buffer loaded with the contents of the trace data bus for providing the content of the trace data bus in a logged data packet.

5. The system as claimed in claim 1 wherein the universal streaming and logging interface includes a data packetizer circuit coupled to a main buffer configured to provide a status register content in a logged data packet.

6. The system as claimed in claim 1 wherein the universal streaming and logging interface includes a data packetizer circuit coupled to a main buffer configured to provide a system time stamp in a logged data packet.

7. The system as claimed in claim 1 wherein the universal streaming and logging interface includes a main buffer coupled to the trace data bus for providing DMA data for the DMA controller or for an advanced extensible interface (AXI) interface.

8. The system as claimed in claim 1 wherein the universal streaming and logging interface includes a data packetizer circuit configured to generate through a packet generation multiplexer.

9. The system as claimed in claim 1 wherein the universal streaming and logging interface includes a data packetizer circuit configured to alter a size of a logged data packet by a packet size comparator.

10. The system as claimed in claim 1 wherein the universal streaming and logging interface includes an asynchronous logging interface unit including a data packer coupled to an async first-in-first-out (FIFO) register configured to capture async data from the internal data path.

11. A method of operation of an electronic system comprising:
monitoring an integrated circuit including:
enabling an internal data path, configured to drive a functional output of the integrated circuit,
generating a trace data bus including capturing, by a universal streaming and logging interface, the status of the internal data path by selecting a combination of four bit registers sampling the internal data path to form the trace data bus, and
accessing a direct memory access (DMA) controller, for managing the storage of the trace data bus, in an external device, with the DMA request from the universal streaming and logging interface;
configuring a support circuit, for receiving the trace data bus including configuring a memory device, as the external device, coupled to the DMA of the integrated circuit; and
analyzing the trace data bus for identifying a failure mode of the integrated circuit.

12. The method as claimed in claim 11 wherein generating the trace data bus includes capturing synchronous data from the internal data path.

13. The method as claimed in claim 11 wherein generating the trace data bus includes capturing asynchronous data from the internal data path.

14. The method as claimed in claim 11 wherein for managing the storage of the trace data bus includes providing the content of the trace data bus in a logged data packet.

15. The method as claimed in claim 11 wherein for managing the storage of the trace data bus includes providing a status register content in a logged data packet.

16. The method as claimed in claim 11 wherein for managing the storage of the trace data bus includes providing a system time stamp in a logged data packet.

17. The method as claimed in claim 11 wherein accessing the direct memory access (DMA) controller, for managing the storage of the trace data bus includes providing DMA data for the DMA controller or for an advanced extensible interface (AXI) interface.

18. The method as claimed in claim 11 wherein accessing the direct memory access (DMA) controller, for managing the storage of the trace data bus includes generating a logged data packet including logged data, a synchronization pattern, a system time stamp, status registers, and a packet number.

19. The method as claimed in claim 11 wherein accessing the direct memory access (DMA) controller, for managing the storage of the trace data bus includes altering a size of a logged data packet.

20. The method as claimed in claim 11 wherein generating the trace data bus including capturing async data from the internal data path by passing the async data between a data packer and an async first-in-first-out (FIFO) register.

* * * * *